(12) United States Patent
Urbano, Jr.

(10) Patent No.: US 7,257,923 B1
(45) Date of Patent: Aug. 21, 2007

(54) FISHING LURE WITH BAIT FISH HOLDER

(76) Inventor: Leonard Urbano, Jr., 590 Muscari St., San Leandro, CA (US) 94578

( * ) Notice: Subject to any disclaimer, the term of this patent is extended or adjusted under 35 U.S.C. 154(b) by 0 days.

(21) Appl. No.: 11/200,328

(22) Filed: Aug. 9, 2005

(51) Int. Cl.
*A01K 85/00* (2006.01)

(52) U.S. Cl. ........................... 43/44.2; 43/42.2

(58) Field of Classification Search ............... 43/44.2, 43/44.4, 42.2, 42.21, 41; D22/129, 131
See application file for complete search history.

(56) References Cited

U.S. PATENT DOCUMENTS

| | | | |
|---|---|---|---|
| 339,952 A | | 4/1886 | Wakeman |
| 1,797,234 A | * | 3/1931 | Jordan .................... 43/42.2 |
| 2,467,971 A | * | 4/1949 | Frair ....................... 43/41 |
| 2,518,593 A | * | 8/1950 | Bell ........................ 43/44.2 |
| 2,565,099 A | * | 8/1951 | Simmons .............. 43/42.03 |
| 2,791,059 A | | 5/1957 | Holmberg |
| 3,197,911 A | | 8/1965 | Rolfsness et al. |
| 4,067,135 A | * | 1/1978 | Martin ................... 43/43.14 |
| 5,177,895 A | | 1/1993 | Baron |
| 5,505,016 A | | 4/1996 | Baron |
| 5,778,593 A | | 7/1998 | Baron |
| 5,893,232 A | | 4/1999 | Horton et al. |
| 6,243,982 B1 | * | 6/2001 | Halterman, Jr. ........... 43/42.21 |
| 6,658,785 B1 | | 12/2003 | Faulkner et al. |
| 6,708,442 B2 | | 3/2004 | Kress et al. |

FOREIGN PATENT DOCUMENTS

WO        WO91/00687        1/1991

OTHER PUBLICATIONS

Franko Bullet Rotator made available by Shelton Products of Newark, California—Promotional material.
Rotary Salmon Killer made available by Pro-Troll Products of Concord, California—Promotional material.
Bechhold Rotary Bullet Bait Holder—Promotional material.

* cited by examiner

*Primary Examiner*—Kurt Rowan
(74) *Attorney, Agent, or Firm*—Thomas R. Lampe

(57) ABSTRACT

A fishing lure includes a bait fish holder for receiving the head of a bait fish. Outwardly projecting wing members and fins on the bait fish holder promote the rotational movement and enhance the dive capabilities of the lure.

16 Claims, 2 Drawing Sheets

FISHING LURE WITH BAIT FISH HOLDER

TECHNICAL FIELD

This invention relates to a fishing lure, more particularly to a fishing lure including a bait fish holder and which is operational to rotate the bait fish when trolling.

BACKGROUND OF THE INVENTION

Fishing lures including bait fish holders are well known. Some of these devices incorporate a cover for receiving the head of the bait fish and structure to maintain the bait fish in place while fishing. It is known to utilize wings or spinners to effect rotational and other movement of the bait fish during trolling or when the lure is cast into a moving body water. One or more hooks are associated with the lures to catch fish attracted by bait fish motion.

The following patents show various lures incorporating one or more of the features referenced above: U.S. Pat. No. 5,893,232, issued Apr. 13, 1999, U.S. Pat. No. 2,791,059, issued May 7, 1957, U.S. Pat. No. 339,952, issued Apr. 13, 1886, U.S. Pat. No. 3,197,911, issued Aug. 3, 1965, U.S. Pat. No. 2,518,593, issued Aug. 15, 1950, U.S. Pat. No. 6,708, 442, issued Mar. 23, 2004, U.S. Pat. No. 6,658,785, issued Dec. 9, 2003, U.S. Pat. No. 2,467,971, issued Apr. 19, 1949, U.S. Pat. No. 5,177,895, issued Jan. 12, 1993, U.S. Pat. No. 5,505,016, issued Apr. 9, 1996, and U.S. Pat. No. 5,778,593, issued Jul. 14, 1998. U.S. International Patent Publication No. WO 91/00687 discloses fishing tackle in the form of a cone positioned over a hook and bait for aiding a fisherman when casting and for avoiding snagging of lines.

Shelton Products of Newark, Calif. makes available the Franko Bullet Rotator trolling rig which incorporates a rotor head receiving the head of bait fish. A toothpick passes through the rotor head and through the bait fish to maintain the bait fish in place. Wings are incorporated with the head, projecting outwardly from opposed sides of the rotor head to impart rotatable motion to the bait fish. Other rotatable live bait holders are the Rotary Salmon Killer made available by Pro-Troll Products of Concord, Calif., incorporating a clip to maintain bait in place and a diagonal fin on the back of the clip to provide bait rolling action, and the Bechhold Rotary Bullet Bait Holder having inner teeth engageable with the bait fish to hold the nose of the bait fish and a rubber band maintaining the teeth in the bait fish.

DISCLOSURE OF INVENTION

The present invention constitutes an improvement over the prior art arrangements, incorporating features which provide faster rotation of the bait fish under comparable conditions and having the ability to quickly go under water and dive to operational depth. Known commercially available arrangements have a tendency to plane on the water surface during trolling for a considerable period of time before diving under the water. Furthermore, the angle of dive tends to be relatively shallow. Not only is it desirable to reach the effective fishing dive depth relatively quickly to actually begin fishing, prolonged location of the lure and bait fish on or immediately below the water surface allows seagulls and other sea birds to attack and wholly or partially remove the bait fish from the lure before fishing really begins.

The fishing lure of the present invention includes a bait fish holder defining a cavity for receiving the head of a bait fish and for imparting rotational movement to the bait fish during trolling.

The bait fish holder has a holder body including first and second side walls defining the cavity. Each of the side walls has a wall top end, a wall front end, a wall bottom end and a wall back end.

A first wing member is attached to and projects outwardly from the first side wall at or closely adjacent to the wall back end thereof. A second wing member is attached to and projects outwardly from the second side wall at or closely adjacent to the wall top end thereof. The first and second side wing members extend along different, angularly disposed planes. Fins are incorporated in the lure and cooperate with the wing members to attain the desired results during trolling.

Other features, advantages and objects of the present invention will become apparent with reference to the following description and accompanying drawings.

MODES FOR CARRYING OUT THE INVENTION

Referring now to FIGS. 1-5, a preferred form of fishing lure constructed in accordance with the teachings of the present invention includes a bait fish holder 10 suitably formed of transparent plastic sheet material and utilizing standard fabrication techniques.

Figure 1:
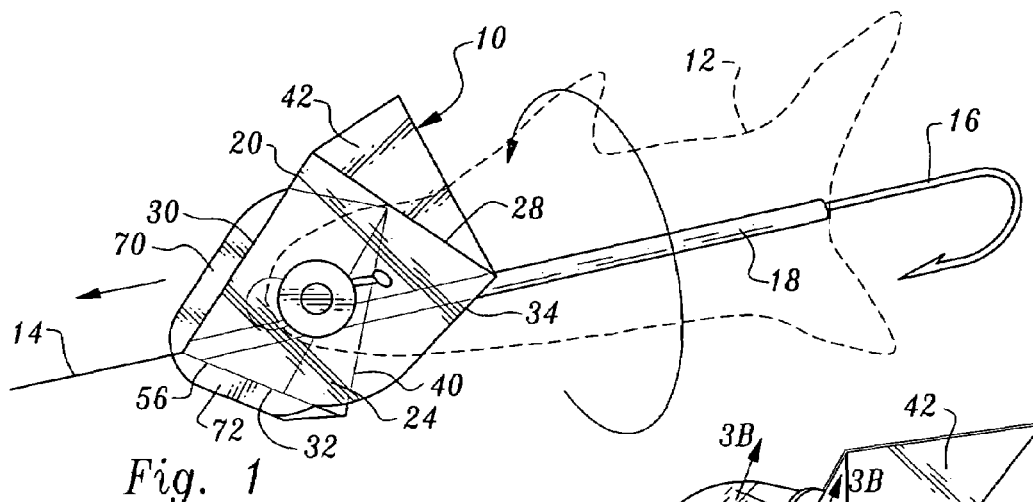
FIG. 1 is a perspective view of a preferred embodiment of fishing lure constructed in accordance with the teachings of the present invention operatively associated with a fishing line and hook, a bait fish being held by the lure illustrated by broken lines.
Figure 2:
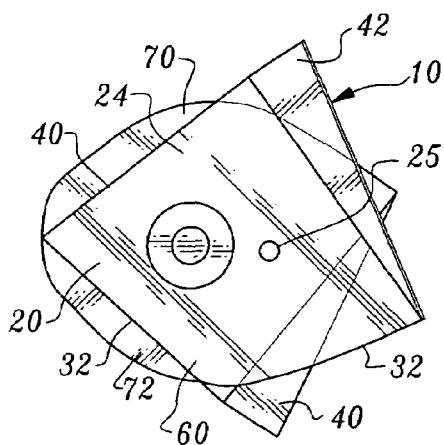
FIG. 2 is a side, elevational view of the lure.
Figure 3A:
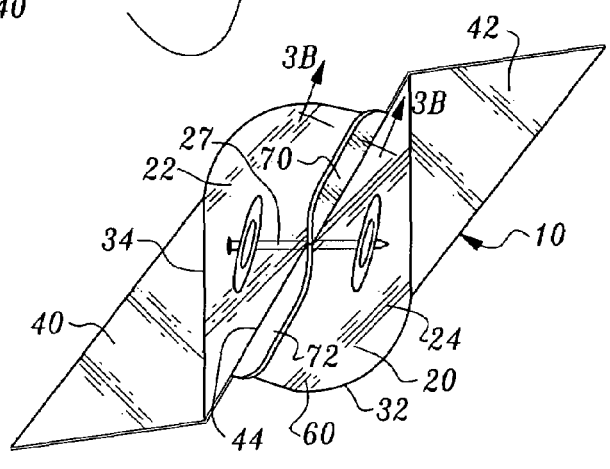
FIG. 3A is a front, elevational view of the lure.
Figure 3B:
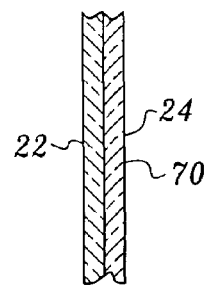
FIG. 3B is a greatly enlarged view of a fin of the lure taken along the line 3B-3B in FIG. 3A.
Figure 5:
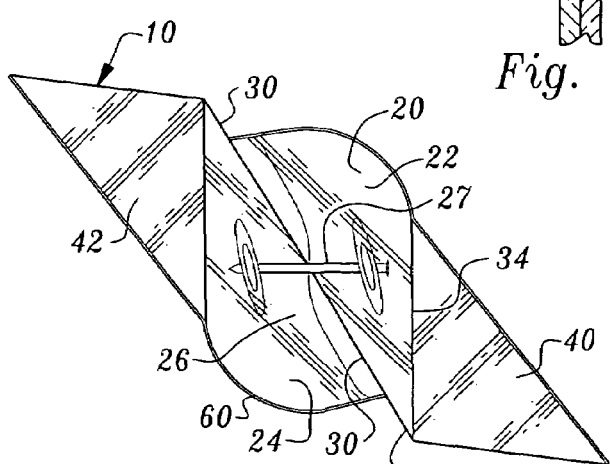
FIG. 5 is a rear, elevational view of the lure.
Figure 4:
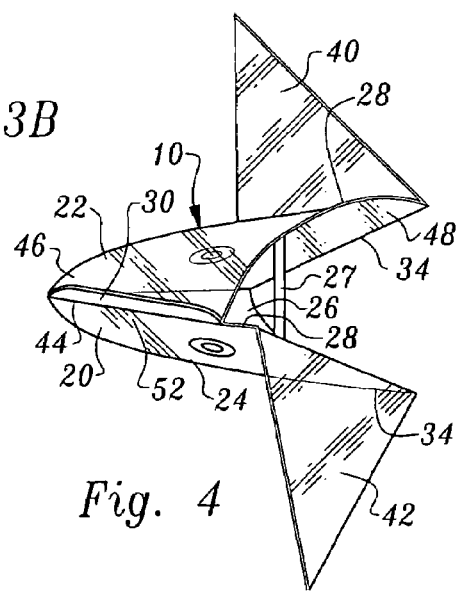
FIG. 4 is a top, plan view of the lure.
Figure 6:
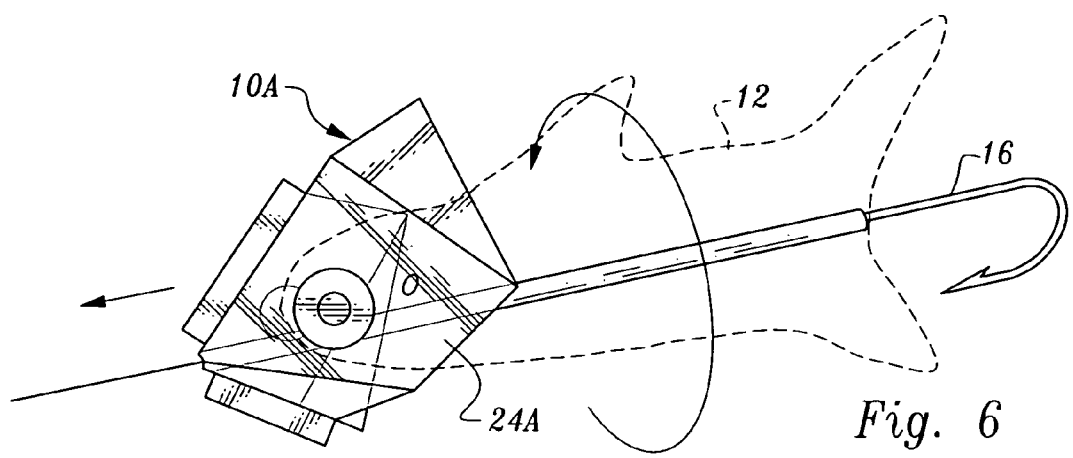
FIG. 6 is a view similar to FIG. 1, but of an alternative embodiment of the lure.
Figure 7:
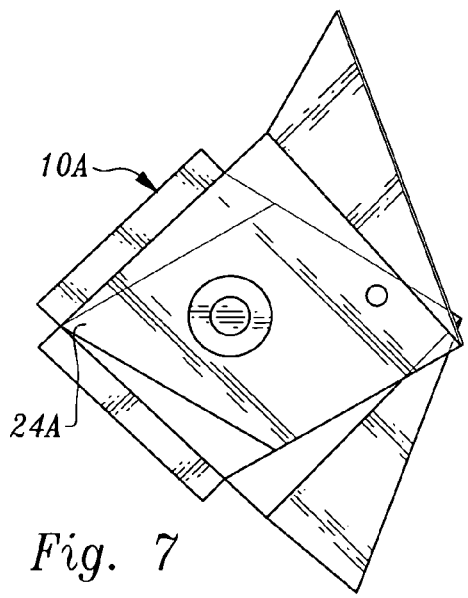
FIG. 7 is a view similar to FIG. 2 of the alternative embodiment.
Figure 8:
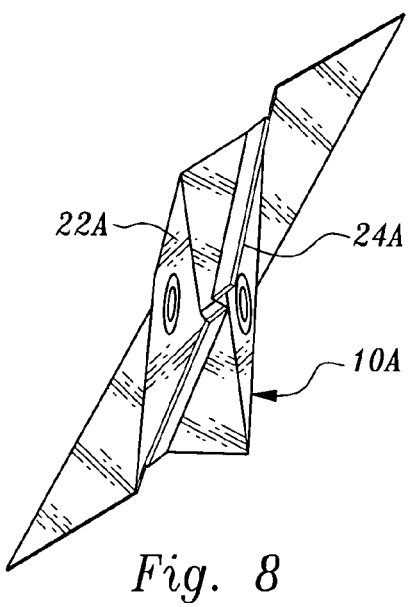
FIG. 8 is a view similar to FIG. 3A of the alternative embodiment.
Figure 10:
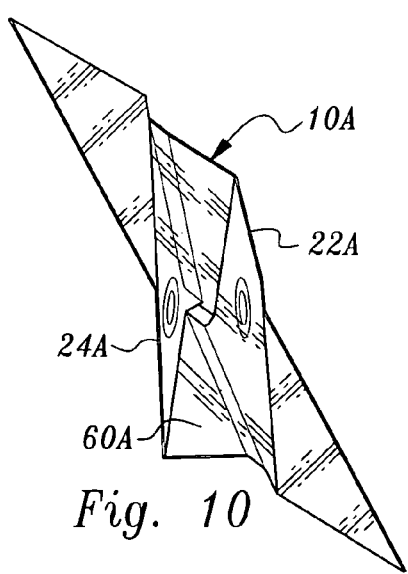
FIG. 10 is a view similar to FIG. 5 of the alternative embodiment.
Figure 9:
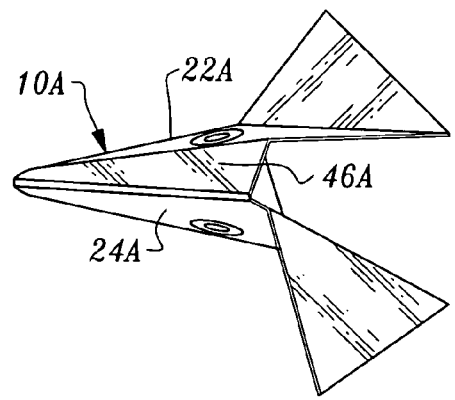
FIG. 9 is a view similar to FIG. 4 of the alternative embodiment.

In FIG. 1, the head of a bait fish 12, shown by broken lines, is disposed in holder 10. Also in that figure, holder 10 is operatively associated with a fishing line 14 passing through the front of the holder. A hook 16 is disposed at the distal end of the line, a portion of the line in this instance being covered by a protective sleeve 18. As the rig is trolled in the direction of the arrowhead, the holder 10 and bait fish 12 will rotate at a relatively rapid rate to attract fish.

The bait fish holder has a holder body 20 including side walls 22, 24 defining cavity 26 accommodating the head of the bait fish. Opposed holes 25 are formed in the side walls to accommodate a toothpick 27 or other elongated member passing through the bait fish to hold it in place.

Each of the side walls 22, 24 has a wall top end 28, a wall front end 30, a wall bottom end 32 and a wall back end 34.

A wing member 40 is attached to and projects outwardly from the wall back end 34 of wall 22. A wing member 42 of construction and shape similar to wing member 40 is attached to and projects outwardly from the wall top end 28 of side wall 24. The wing members 40, 42 extend along different, angularly disposed planes generally orthogonal to one another.

The wall front ends 30 of the side walls 22, 24 are joined along a front line of juncture 44 located and extending between the wall top ends and the wall bottom ends thereof. The side wall 22 includes a side wall front portion 46 extending outwardly and rearwardly from the front line of juncture 44, the side wall front portion 46 being curved. The side wall 22 also includes a planar side wall rear portion 48 attached to the wing member 40 and from which wing member 40 projects.

The side wall 24 includes a substantially planar side wall front portion 52 substantially co-planar with the front line of juncture 44. Wall 24 also includes a curved side wall bottom portion 60.

The cavity 26 has a cavity front and the curved side wall front portion 52 covers the cavity front.

The wall bottom ends of the side walls 22, 24 are joined along a bottom line of juncture 56 located and extending between the wall front ends and the wall back ends thereof.

The curved side wall bottom portion 60 of side wall 24 diverges outwardly and upwardly from the bottom line of juncture 56. Side wall 24 also has a substantially planar side wall top portion 62 attached to wing member 42 and from which wing member 42 projects. Side walls 22, 24 diverge away from one another as they extend upwardly from the bottom line of juncture 56. The cavity 26 has a cavity bottom covered by curved side wall bottom portion 60.

A diagonally disposed, canted front fin 70 projects outwardly from front line of juncture 44, the fin 70 in the illustrated embodiment being comprised of overlapping plastic sheet material of the side walls 22, 24. A diagonally disposed, canted bottom fin 72 projects outwardly from the bottom line of juncture 56, fin 72 also being formed of overlapping portions of the side walls 22, 24. The diagonally disposed, canted fins 70, 72 are canted or angled in generally opposed directions and cooperate with the wing members 40, 42 to impart rapid rotation to the bait fish holder and bait fish and promote relatively rapid downward descent of the lure to operating depth. Furthermore, the double thickness construction of the fins 70, 72 provides strength and rigidity to the fish holder.

FIGS. 6-10 illustrate another embodiment 10A of the fishing lure. In lure 10A the side walls 22A, 24A have configurations differing from those of side walls 22, 24 of the first embodiment. In particular, there are no curved side wall portions, the side walls 22A, 24A being formed by straight or planar portions. For example, the side wall front portion 46A and the wall bottom portion 60A are straight.

The invention claimed is:

1. A fishing lure including a bait fish holder defining a cavity for receiving the head of a bait fish and for imparting rotational movement to said bait fish during trolling, the bait fish holder having a holder body including first and second side walls defining said cavity, each of said side walls having a wall top end, a wall front end, a wall bottom end and a wall back end, a first wing member attached to and projecting outwardly from said first side wall at or closely adjacent to the wall back end thereof, and a second wing member attached to and projecting outwardly from said second side wall at or closely adjacent to the wall top end thereof, said first and second wing members extending along different, angularly disposed planes, the wall front ends of said first and second side walls being joined along a front line of juncture located and extending at least partially between the wall top ends and the wall bottom ends thereof, and said first side wall including a first side wall front portion extending outwardly and rearwardly from said front line of juncture and a substantially planar first side wall rear portion attached to said first wing member.

2. The fishing lure according to claim 1 wherein said planes are generally orthogonal to one another.

3. The fishing lure according to claim 1 wherein said second side wall includes a substantially planar second side wall front portion substantially co-planar with said front line of juncture.

4. The fishing lure according to claim 3 wherein said cavity has a cavity front, said first side wall front portion substantially covering said cavity front.

5. The fishing lure according to claim 4 wherein said first side wall front portion is curved.

6. The fishing lure according to claim 1 additionally including a diagonally disposed, canted front fin projecting outwardly from said front line of juncture.

7. The fishing lure according to claim 1 additionally including canted fins connected to said holder body at locations spaced from said wing members, said canted fins extending in generally opposed directions.

8. A fishing lure including a bait fish holder defining a cavity for receiving the head of a bait fish and for imparting rotational movement to said bait fish during trolling, the bait fish holder having a holder body including first and second side walls defining said cavity, each of said side walls having a wall top end, a wall front end, a wall bottom end and a wall back end, a first wing member attached to and projecting outwardly from said first side wall at or closely adjacent to the wall back end thereof, and a second wing member attached to and projecting outwardly from said second side wall at or closely adjacent to the wall top end thereof, said first and second wing members extending along different, angularly disposed planes, the wall bottom ends of said first and second side walls being joined along a bottom line of juncture located and extending at least partially between the wall front ends and the wall back ends thereof, and said second side wall including a second side wall bottom portion diverging outwardly and upwardly from said bottom line of juncture and a substantially planar second side wall top portion attached to said second wing member.

9. The fishing lure according to claim 8 wherein said first and second side walls diverge away from one another as they extend upwardly from said bottom line of juncture.

10. The fishing lure according to claim 8 wherein said cavity has a cavity bottom, said second side wall bottom portion substantially covering said cavity bottom.

11. The fishing lure according to claim 10 wherein second side wall bottom portion is curved.

12. The fishing lure according to claim 8 additionally including a diagonally disposed, canted bottom fin projecting outwardly from said bottom line of juncture.

13. The fishing lure according to claim 6 constructed of plastic sheet material, said diagonally disposed, canted front fin comprised of overlapping plastic sheet material of said first and second side walls.

14. The fishing lure according to claim 12 constructed of plastic sheet material, said diagonally disposed, canted bot tom fin comprises of overlapping plastic sheet material of said first and second side walls.

15. The fishing lure according to claim 4 wherein said first side wall front portion is substantially straight.

16. The fishing lure according to claim 10 wherein said second side wall bottom portion is substantially straight.

* * * * *